Oct. 8, 1968 R. B. BARROW ETAL 3,405,220
INDUCTION ELECTRIC MOLD HEATER
Filed July 16, 1965

INVENTORS
ROBERT B. BARROW
LARRY W. SINK
BY Charles Q. Warren
ATTORNEY

United States Patent Office 3,405,220
Patented Oct. 8, 1968

3,405,220
INDUCTION ELECTRIC MOLD HEATER
Robert B. Barrow, Chesire, and Larry W. Sink, Northford, Conn., assignors to United Aircraft Corporation, East Hartford, Conn., a corporation of Delaware
Filed July 16, 1965, Ser. No. 472,644
6 Claims. (Cl. 13—27)

ABSTRACT OF THE DISCLOSURE

A mold heater for producing controlled grain high temperature alloys wherein a temperature gradient is established from one end of the mold to the other during solidification of the melt. The temperature gradient is established along a transverse solid-liquid front and moves at a selected rate from one end of the mold to the other.

---

This invention relates to a mold heater particularly adapted for controlled cooling of molten metal in a mold.

In producing cast articles with a controlled grain structure it is desirable to heat the mold to a high temperature prior to and during the pouring of metal into the mold. In certain cases it is also desirable to hold the mold at a selected temperature for a predetermined time after the metal is poured. One feature of the invention is a mold heater within which the mold may be positioned and by which the selected temperature of the mold can be established and maintained.

In many instances it is also desirable to establish a temperature gradient from one end of the mold to the other during solidification in order to cause solidification along a transverse solid-liquid front moving at a selected rate from one end of the mold to the other. A feature of the invention is a mold heater by which to accomplish this result.

Other features and advantages will be apparent from the specification and claims, and from the accompanying drawings which illustrate an embodiment of the invention.

Figure 1:
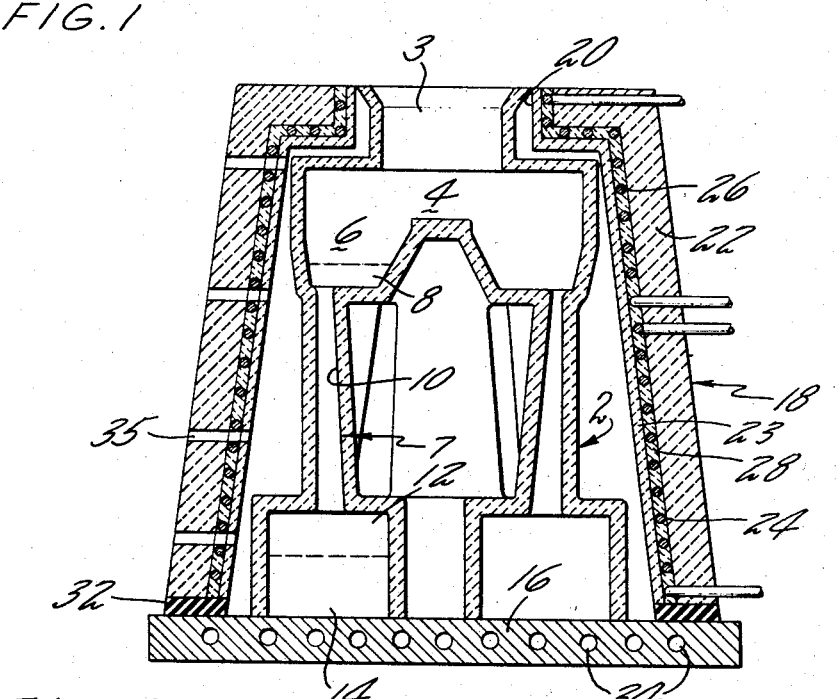
FIG. 1 is a transverse sectional view through a mold and surrounding heater.

Referring first to FIG. 1, the mold is an investment shell mold 2 having a pouring sprue 3, a plurality of interconnecting fingers 4 extending laterally from the sprue to a closed top 6 on each of the individual mold elements 7 for the cast articles. The particular cast article shown is a turbine blade having a shroud 8 at the lower part of the top 6, an airfoil portion 10, and a root portion 12. Below the root portion is a growth area 14, the latter resting directly on a chill plate 16.

The mold is heated, in performing the unidirectional solidification process, by the enclosing mold heater in the form of an inverted cup 18 having a central opening 20 to receive the pouring sprue. The cup is made up of an outer wall 22 formed from a suitable insulating refractory such as a low density aluminum oxide. Positioned inside the outer wall and in contact with a liner 23 are a plurality of electrical heating coils 24 and 26 which are in axial alignment and which are so arranged that each coil may be separately heated or all may be heated at once. A refractory cement 28 holds the heating coils in position between the wall 22 and the ceramic liner 23 of a material selected for transmitting heat rapidly to the mold. One example of the refractory cement may be an aluminum oxide cement and the liner may be a high density aluminum oxide.

The periphery of the cup, inverted, rests on an insulating ring 32 at the edge of the chill plate 16 thereby supporting the cup around and in close proximity to the mold and in a position to expose the pouring sprue through the central opening in the bottom of the cup.

In operation, the heating coils in the inverted cup are energized and the heat from the coils heats the mold to a temperature above the melting point of the alloy to be poured. At the same time the chill plate is kept cool by circulating water through the passages 34 in the plate. When the temperatures have become stabilized the alloy is poured into the mold and solidification begins at the chill plate. The first cooling is random crystallization but as solidification and crystalline growth continues upward as determined by the rate at which the mold is allowed to cool, columnar grains are formed and the result is a plurality of grains extending from bottom to top of each of the mold elements 7. As solidification begins the cooling of the mold is controlled by progressively reducing the heat input to the bottom coil 24 and subsequently to the top coil 26, so that a gradual cooling to a solidification temperature occurs from the chill plate to the top of each mold. For temperature indication the cup may have openings 35 for thermocouples where desired.

Figure 2:
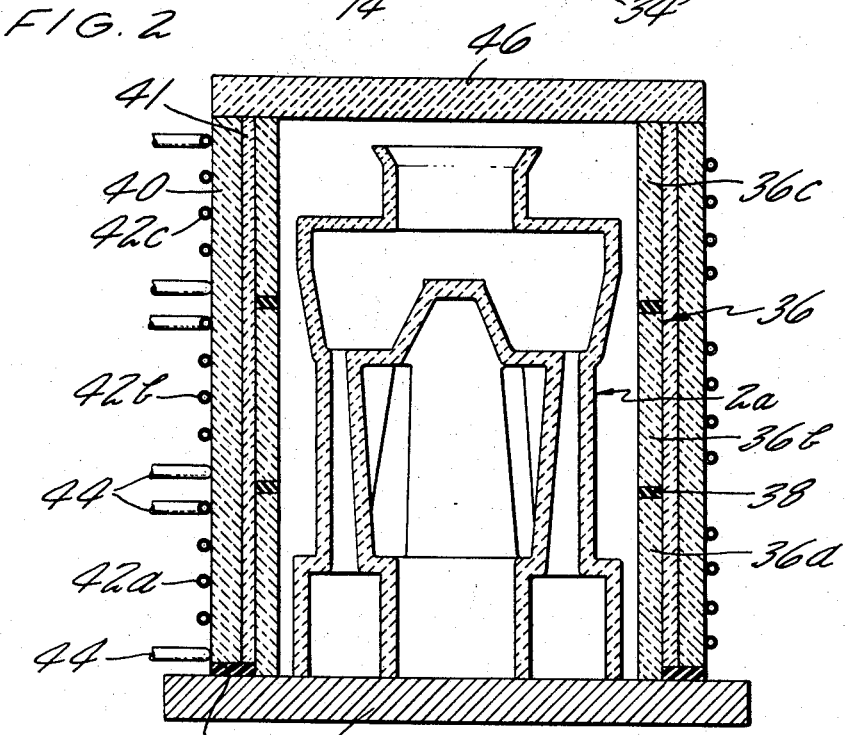
FIG. 2 is a view similar to FIG. 1 of a modification.

The arrangement of FIG. 2 accomplishes much the same purpose but uses induction heating and one or more graphite susceptors. As shown, the shell mold 2a, similar to that of FIG. 1, is placed in the same position on the chill plate 16a and is surrounded by a heating structure to accomplish the heating performed by the inverted cup of FIG. 1. In FIG. 2, however, the mold 2a is surrounded by a sleeve 36 preferably made of graphite and constituting a graphite susceptor for transmission of heat to the mold. The sleeve 36 may be a single piece or may be made up of short sections 36a, 36b and 36c, as shown, which are in alignment and are spaced slightly one from another by thin insulating rings 38. These sleeve sections and the insulating rings 38 are held in position by concentric surrounding cylinders 40 and 41 of insulating material, for example the cylinder 40 is aluminum silicate and the cylinder 41 is a graphite felt. These cylinders 40 and 41 are self supporting and rest on a ring 42 of insulating material at the periphery of the chill plate 16a. The cylinder 40 is surrounded by a plurality of axially aligned induction heating coils 42a, 42b and 42c by which to control the heat input to the mold at different heights. As shown the susceptor sections are coextensive axially with the individual surrounding coils.

Suitable electrical leads 44 provide for electrical connection to each coil and the coils are preferably tubular to provide for water cooling of the coils.

During heating of the mold, a movable heat shield 46 may be positioned over the top of the mold and the surrounding cylinders.

The operation of this device is the same as that of FIG. 1, with the solidification of the poured metal beginning at its direct contact with the chill plate and moving progressively upward on a solid-liquid front that remains substantially horizontal as it moves vertically toward the top of the mold.

The device may be used for producing vanes or blades for gas turbines as described in the copending application of Ver Snyder, Ser. No. 361,323, filed Apr. 17, 1964, now Patent No. 3,260,505, and assigned to the same assignee as the present application.

It is to be understood that the invention is not limited to the specific embodiment herein illustrated and described but may be used in other ways without departure from its spirit as defined by the following claims.

We claim:

1. A heater for a mold for providing high temperature alloys with a controlled grain structure including a sleeve of refractory material being capable of being used as a secondary, and the sleeve having a length greater than the height of the mold to fit over the mold, one end of the mold and the corresponding end of the sleeve resting on and being supported by a chill plate, at least two induction heating coils in axial alignment, the coils surrounding and being supported by a tubular cylinder of insulating material, the sleeve consisting of at least as many cylindrical sections as there are heating coils and the sleeve constituting a secondary for the heating coils, the coils and tubular cylinder surrounding the cylindrical sleeve sections, means for separately controlling the supply of energy to the coils and establishing a temperature gradient from one end to the other of the mold and sleeve, and means for retaining the sleeve in position within the coils.

2. A heater as in claim 1 in which the sleeve is made up of sections substantially coextensive with the individual heating coils.

3. A heater as in claim 1 in which the sleeve is graphite and the heating coils are induction coils.

4. A heater as in claim 1 in which the sleeve is surrounded by concentric cylinders, the inner of which is graphite felt and the outer of which is a refractory.

5. A heater for a mold for providing high temperature alloys with a controlled grain structure including a sleeve of graphite material having a length greater than the mold height and an internal diameter slightly greater than the mold to be heated, the sleeve being open at one end to receive the mold therein, the opposite end of the sleeve and corresponding end of the mold resting on a chill plate, the sleeve consisting of three axially aligned cylindrical sections, three axially aligned induction heating coils, each of the individual coils surrounding an individual section of the sleeve, each of the sections thereby being a susceptor and heated by the coils, the coils surrounding and being supported by a tubular cylinder of insulating material interposed between the sleeve and the coils and means for controlling the energy supplied to the coils thereby permitting a temperature gradient to exist from one end of the sleeve and mold to the other end.

6. A heater as in claim 5 including a removable and replaceable cover of insulating material which is positioned on the sleeve after the mold is inserted therein.

References Cited

UNITED STATES PATENTS

| 3,036,888 | 5/1962 | Lowe | 13—26 X |
| 3,078,529 | 2/1963 | Cooper et al. | 13—31 X |
| 3,226,223 | 12/1965 | Bussard et al. | 13—31 X |
| 1,842,272 | 1/1932 | Knerr | 13—27 |
| 1,859,680 | 5/1932 | Neuhauss | 13—27 |
| 1,926,573 | 9/1933 | Willcox | 13—27 |
| 2,635,125 | 4/1953 | Upton | 13—27 |
| 2,673,228 | 3/1954 | Kistler | 13—26 |
| 2,773,750 | 12/1956 | Conant | 23—27 |
| 2,909,585 | 10/1959 | Tudbury | 13—27 |

BERNARD A. GILHEANY, *Primary Examiner.*

V. Y. MAYEWSKY, *Assistant Examiner.*

PATENT OFFICE

Washington, D.C. 20231

UNITED STATES PATENT OFFICE
CERTIFICATE OF CORRECTION

Patent No. 3,405,220                        October 8, 1968

Robert B. Barrow et al.

It is certified that error appears in the above identified patent and that said Letters Patent are hereby corrected as shown below:

Column 3, line 17, cancel "and the heating coils are induction coils".

Signed and sealed this 17th day of February 1970.

(SEAL)
Attest:

Edward M. Fletcher, Jr.                  WILLIAM E. SCHUYLER, JR.
Attesting Officer                            Commissioner of Patents